US011721991B2

(12) United States Patent
Basogiannis

(10) Patent No.: US 11,721,991 B2
(45) Date of Patent: Aug. 8, 2023

(54) SOLAR-POWERED TABLE CHARGING BASE WITH DETACHABLE PARTS

(71) Applicant: Nikolaos Basogiannis, Chaidari Attiki (GR)

(72) Inventor: Nikolaos Basogiannis, Chaidari Attiki (GR)

( * ) Notice: Subject to any disclaimer, the term of this patent is extended or adjusted under 35 U.S.C. 154(b) by 94 days.

(21) Appl. No.: 17/284,974

(22) PCT Filed: Jan. 9, 2020

(86) PCT No.: PCT/GR2020/000004
§ 371 (c)(1),
(2) Date: Apr. 13, 2021

(87) PCT Pub. No.: WO2020/148558
PCT Pub. Date: Jul. 23, 2020

(65) Prior Publication Data
US 2021/0359529 A1 Nov. 18, 2021

(30) Foreign Application Priority Data

Jan. 16, 2019 (GR) .............................. 20190100029

(51) Int. Cl.
*H01M 10/46* (2006.01)
*H02J 7/00* (2006.01)
*H02J 7/35* (2006.01)

(52) U.S. Cl.
CPC .............. *H02J 7/0044* (2013.01); *H02J 7/35* (2013.01)

(58) Field of Classification Search
CPC .......... H02J 7/35; H02J 7/0044; H02J 7/0042; Y02E 10/50; Y02E 60/10; H01M 10/46; H01M 10/465; H02S 10/40; H02S 40/38; H02S 20/00
USPC ................................. 320/101, 107, 114, 115
See application file for complete search history.

(56) References Cited

U.S. PATENT DOCUMENTS

2002/0194075 A1* 12/2002 O'Hagan .............. H02J 7/0044
705/20
2008/0128505 A1* 6/2008 Challa .................. G06K 7/1095
235/462.01

* cited by examiner

*Primary Examiner* — Edward Tso

(57) ABSTRACT

The invention concerns a table-top charging base having two parallel L-shaped members supporting a charging station therebetween with four screws inserted in proportional facing identical holes. A detachable solar collector is magnetically detachable to one of the two L-shaped members. A detachable price list is also magnetically attached to another of the two L-shaped members. The two L-shaped members each carry a strip trim to support an electronic device safely during recharging. The table-top charging base allows for display of advertisements to consumers in exchange for recharging electronic devices, for example.

4 Claims, 5 Drawing Sheets

SOLAR-POWERED TABLE CHARGING BASE WITH DETACHABLE PARTS

CROSS-REFERENCE TO RELATED APPLICATIONS

The present application is a national stage entry, filed Apr. 13, 2021, of international application no. PCT/GR2020/000004, filed on Jan. 9, 2020, which claims priority to Greek application no. 20190100029, filed on Jan. 16, 2019.

STATEMENT REGARDING FEDERALLY SPONSORED RESEARCH OR DEVELOPMENT

Not applicable.

PARTIES TO A JOINT RESEARCH AGREEMENT

Not applicable.

SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The present invention concerns a table base made from a compact material hosting charging station (Power bank), for recharging electronic devices, (mobile, tablet, electronic cigarettes, etc.) while having an attached-detachable magnetic solar panel providing additional recharge in addition to its charging via electricity, which can operate independently as a solar charger of an electronic charging device. Also, an additional part of the construction is the magnetically attached-detached from the main body price list, promotion double-sided panel with the possibility of easy renewal of its content and its use as an independent price list by the user.

In the previous technique there is no possibility to recharge the charging station (Power bank) in addition to charging via electricity, reducing the autonomy of the charging station, resulting in continuous recharge non-functional during the useful use.

The advantage of this invention is the possibility of alternative recharge of the charging station (Power bank) via the magnetically attached-detachable solar collector that operates interchangeably and as an independent solar charger of one electronic device.

In the previous technique the hosting of printed material (price list-promotion) is built into the main base of the table charging base, making it non-functional due to the use of only one side of the booklet.

Advantage of this invention is the possibility of using magnetically attached-detachable price list, promotion panel on both sides of the table charging base, double-sided which is alternatively offered as an independent price list to the customer.

In the previous technique there is no provision for a position to support electronic devices during their recharge, while the present invention allows the support of up to two electronic devices on each horizontal side of the table support base with the use of support strip trim.

Another advantage of this invention is the positions of support of the charging cables, protecting them from any humidity by setting them in a functional made and harmless to the charging devices as well as the charging station itself.

In this table charging stand we achieve the reduction of the assembled parts which otherwise would need three and more parts of various materials, different size or type, significantly increasing the cost of construction, repairs and time needed for assembly.

This construction has a handle making its transport easier therefore preventing accidents and damage since its use will be continuous by various users.

The multipurpose charging stand is a versatile tool with alternative uses enabling the prospective buyer to adjust it according to their needs.

SUMMARY OF THE INVENTION

The present invention covers the needs of an enterprise to charge the electronic devices of its customers securely without the supervision of the company because the invention is next to the client under his/her absolute control. It can be used in various public places such as conferences—lounge areas, but mainly ideal for summer season operations due to its extra capacity with the use of the magnetically attached-detachable solar charger to ensure greater autonomy of the power bank, as well as the solar charger to operate as a standalone charger of an electronic device in more distant places (e.g., beach loungers). In this way the company has a double benefit since the present invention can act as two independent electronic device chargers, as well as minimizing the time of its continuous recharging of the table charging base. This achieves a more economical result for the company due to the ordering of fewer pieces of table base charging stations.

At the same time, the invention provides the owner with the magnetic attachment—detachable price list—promotion double sided with the ability to easily renew its content, providing the company with the flexibility to use it as an advertising medium, promotion, price list, either magnetically attached on one of the two sides of the charging table or used independently.

In case of non-sufficiency of double-sided product list space there is the possibility of buying additional low-cost price list materials for placing it on the facing side of the construction, giving us flexibility and functionality.

The present invention has been designed to provide the user with two bases for electronic devices during their recharge at the bottom of the table support base, thus providing the end-user with safety in the event of an accident.

Additional safety in the frequent transport and avoidance of damage when in contact with the user of the construction is achieved through the handle which is placed on the upper part of the table charging base.

The whole construction is designed with minimal assembled components providing complete theft prevention in the integrated charging station as well as replacement of the charging station due to easy dismantling—assembly of the whole construction.

BRIEF DESCRIPTION OF THE DRAWINGS

The invention will be better understood with reference to the following drawings.

DETAILED DESCRIPTION OF THE INVENTION

Figure 1:
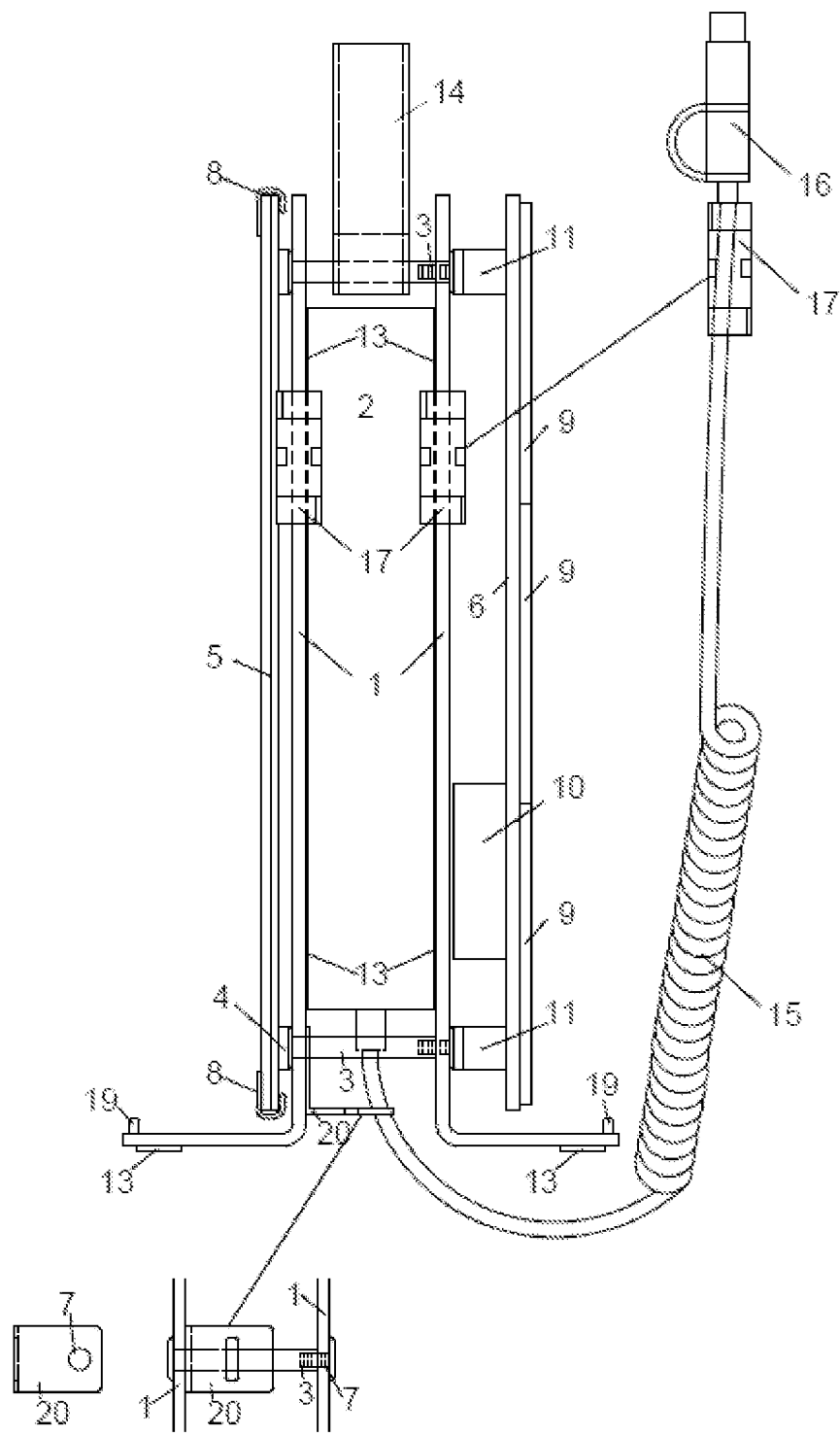
FIG. 1 is a side view of a charging base according to a preferred embodiment of the invention.

In the illustrations of the drawings (FIG. 1, 2), the multi-purpose table charging stand is shown in side view. The two identical vertical member form angles (L) of compact material (1), which sandwich the charging station (2) on either side with the use of four flat anti slip (13) for safety and stability of the charging station (2). Tethering and tightening is done with the use of four screws (3), by fixing them to the corresponding identical facing holes (7) of the two identical vertical member forming angles (L-type) of solid material (1).

On the upper sides of the bases of the two vertical facing members (1), adhesive strip trim are placed (19) giving the ability to support electronic charging devices during their charging.

For the non-slip stability of the main base of the electronic device charging charger, four special anti-slip levels (13) are placed under the base, on the horizontal side, of the two identical members (1) making it stable even on a wet or slippery surface.

At the bottom of the charging station (2) are the USB outputs where cable charging cables (15) are installed with different terminals (16) depending on the type of electronic device.

After use of cable wires (15) and terminals (16), the cables can be repositioned in the special mounting brackets (17).

On the upper screws (3) of the two identical vertical corners (1) a handle is placed (14) for the safe transport of the table charging base.

The first magnetically attached and detachable solar charger panel (9) (FIG. 1, 2, 6) of the main body of the charging station (2) is glued on a compact surface of the same size (6). The solar panel (9) is connected to the USB charging circuit (10) that is placed on the back of the compact surface (6) which in turn recharges the main charging station (2).

Figure 2:
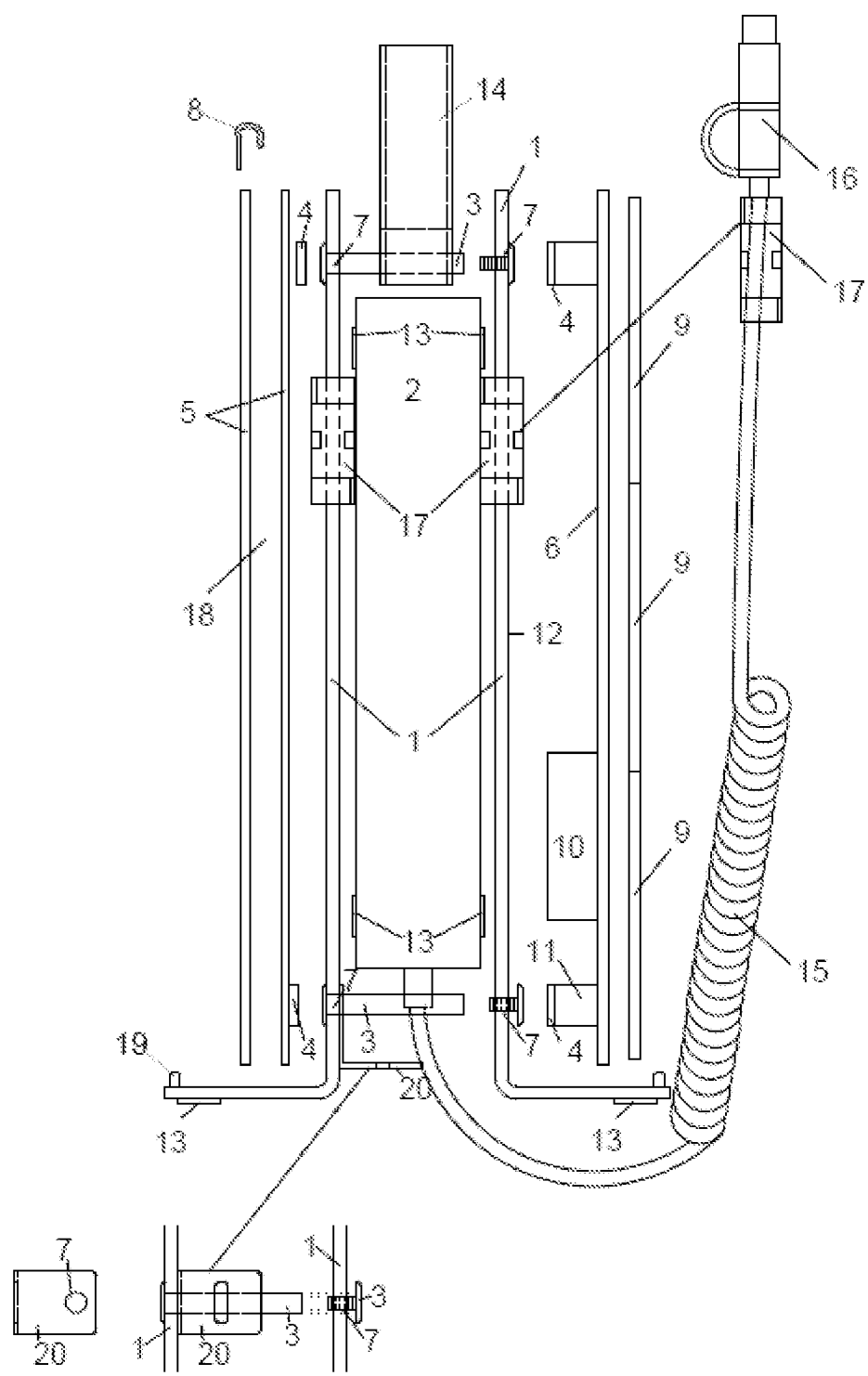
FIG. 2 is the side view of the charging base of FIG. 2, wherein a clip is removed from around two plates for holding promotional materials therebetween.
Figure 3:
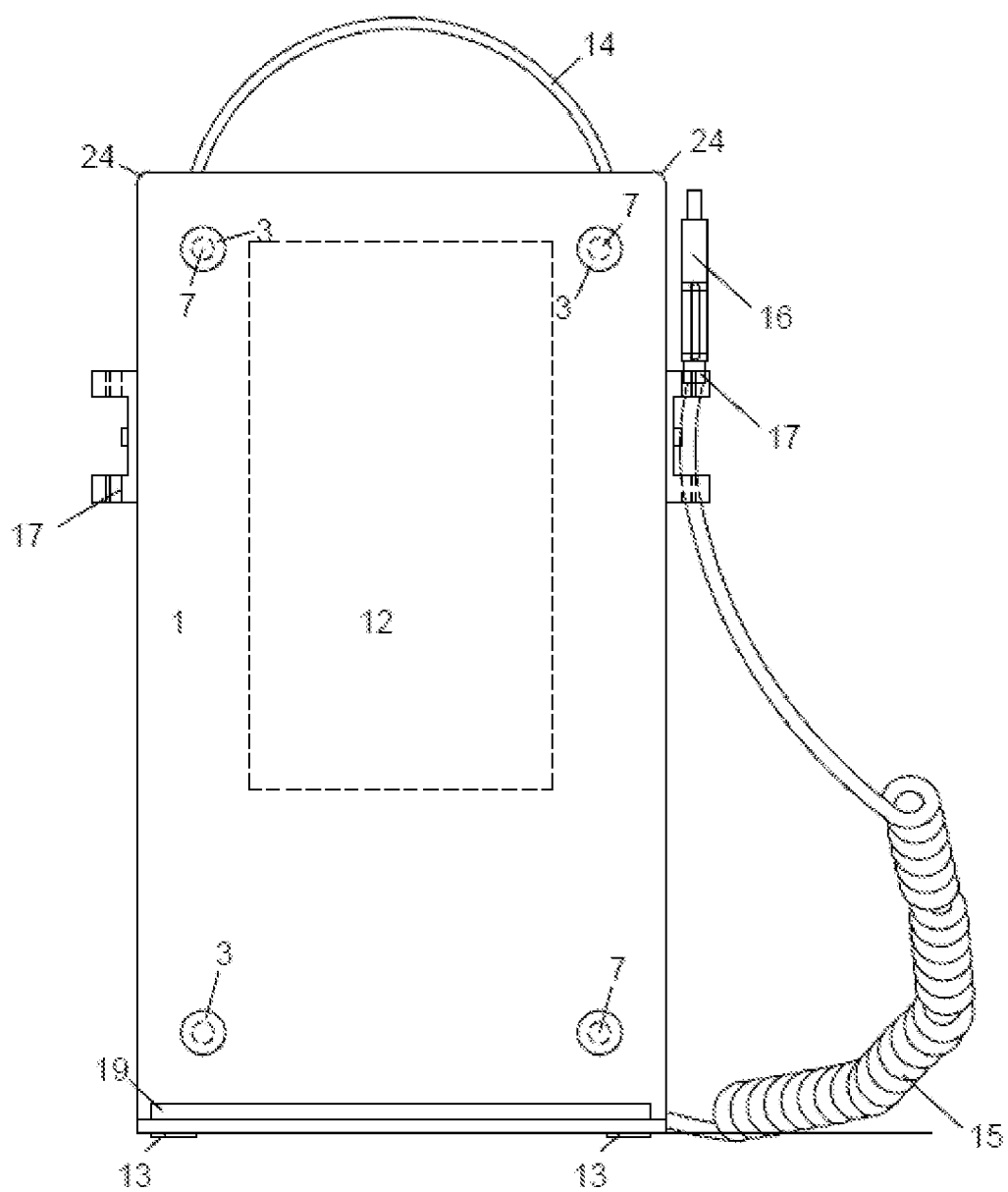
FIG. 3 is a front view of the charging base of FIG. 2, with the two plates for holding promotional materials therebetween detachably removed.
Figure 4:
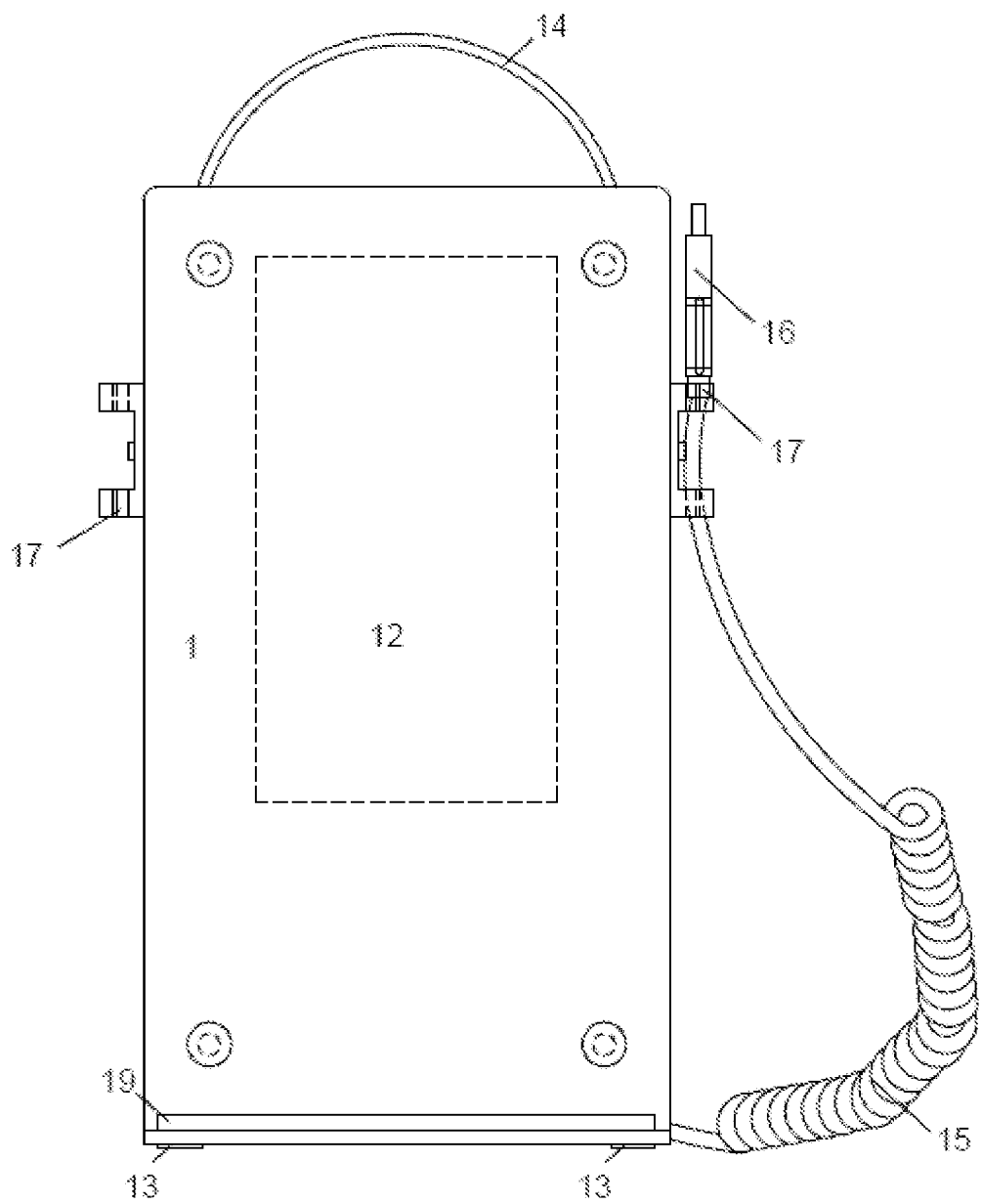
FIG. 4 is a back view of the charging base of FIG. 2, with a solar panel detachably removed and a charging cable reversibly held in another mounting bracket.

The solar panel is attached to the main part of the base of the construction using four tubes-spacers (11) attached to the back of the compact surface (6). On the free side of the four tubes (11), four circular magnets are attached (4) (FIG. 2) that magnetically attach and detach to the four screws (3) on one of the two identical vertical members.

The second attached and detachable additional part of the invention (FIG. 1, 2, 5) is the magnetic detachable price list double-sided promotion panel consisting of two surfaces of compact material of the same size (5). Between them is placed the printable price list or the promotion (18), which is sandwiched between the two surfaces and held in place with two clips (8).

The price list panel is attachable and detachable to the main part of the construction base using four circular magnets (4) stuck on the back of the price list, where the panel magnetically attaches and detaches to the four screws (3) of the second of the two identical vertical members (1).

The whole construction is secured by the use of an anti-theft member (20) which is attached to one of the two lower fastening screws of the base (3) between the two identical vertical member angles (1).

One of the two sides of the anti-theft member has a hole in which passed is passed and secured one of the two lower fastening screws (3) of the charging table.

The other side of the anti-theft member has a Kensington type hole compatible with all the locks of this type such as laptop security locks. This side is easily accessible by the user.

Figure 6:
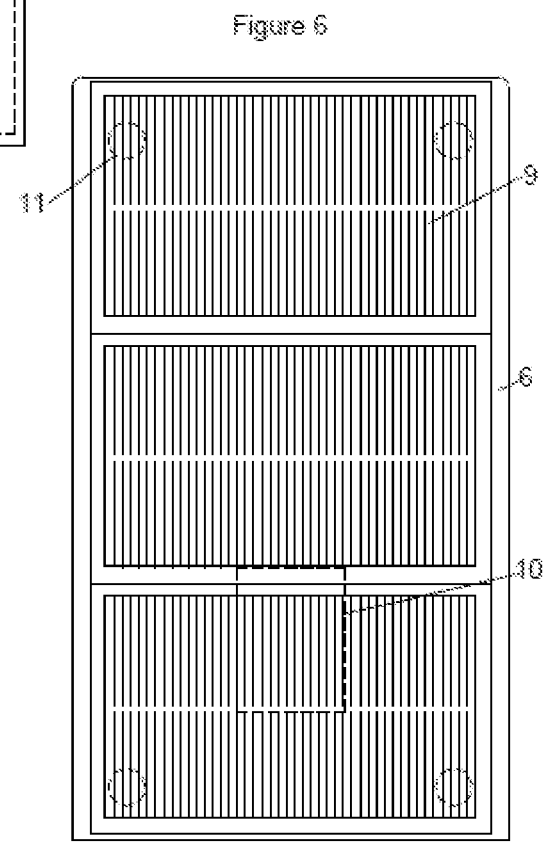
FIG. 6 is a front view of the solar panel according to the preferred embodiment.

A typical example of use of the charging base of the present invention is a summer-seaside shop cafe which has been supplied with six multi-purpose table charging bases. During the morning hours at the opening of the store the table charging chargers with the attached-detachable magnetic solar panels (FIG. 6) are exhibited for customers to use and at the same time to recharge in their charging station (FIG. 1, 2). In this way the owner of the store does not need to recharge the charging stations (FIG. 1, 2) every night so that they have them ready for use for the next day. With the present invention and the parallel use of the solar charger (FIG. 6) time is saved (FIG. 1, 2) as well as duration of use due to the constant charging from the charging station (FIG. 1, 2) from the solar charger (FIG. 6). In exceptional cases the owner can individually offer the magnetic solar charger (FIG. 6) at more distant points such as e.g., on the sun beds of the beach, providing extra services beyond the multipurpose table charger. With the above use the whole invention is environmentally friendly saving daily recharge power consumption of the charging station (FIG. 1, 2), as well as providing multifunction since it can act as an independent solar Charger for a device.

Figure 5:
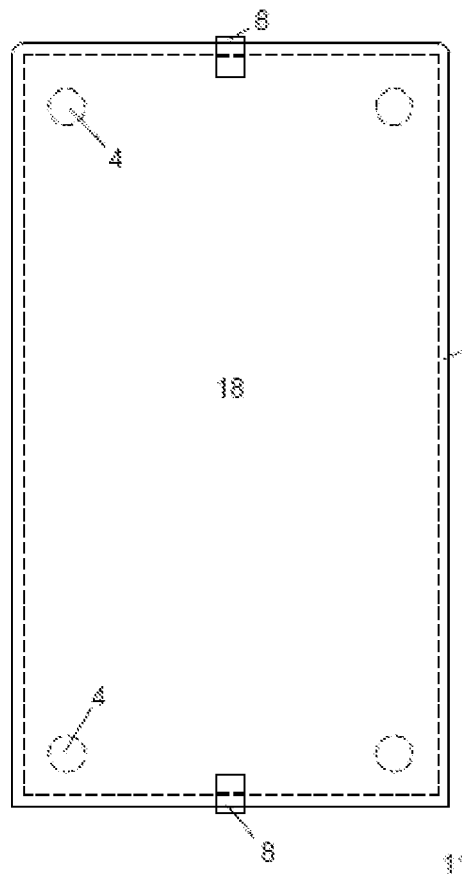
FIG. 5 is a front view of the two plates for holding promotional materials therebetween according to the preferred embodiment.

At the same time the magnetically attached-detachable price list-promotion (FIG. 5) is used as a double-sided price list for its customers as well as promotion in some special cases of offers-advertising with easy replacement from the owner.

The price list-promotion (FIG. 5) is available as an independent price list to the customer as it is magnetically attached-detached from the body of the whole construction.

Thus, the shop owner achieves a maximum performance gain of the device, with multifunctionality and economy.

The invention claimed is:

1. A tabletop charging stand, comprising:
   two vertical L-shaped members, the two L-shaped members positioned on either side of and supporting a side of a charging station, the two L-shaped members secured together by four clamping screws each with a smooth surface on a screw head, fastened through corresponding holes in the two L-shaped members;
   a solar panel having a solar cell attached to a front side of a sheet of compact material, the solar cell connected to a USB charging circuit placed on a back side of the sheet of compact material, four magnets attached to the back side of the sheet such that the solar panel is magnetically attachable and detachable to a first L-shaped member of the two L-shaped members via the four clamping screws; and a promotional panel having two transparent sheets compact material securable together with two clips, four other magnets attached to a back side of one of the two transparent sheets such that the promotional panel is magnetically attachable and detachable to a second L-shaped member of the two L-shaped members via the four clamping screws, wherein an adhesive strip trim (19) is attached to an upper horizontal side of each of the L-shaped members to provide support to an electronic device during charging, and wherein the USB charging circuit recharges the charging station when the solar panel is magnetically attached to the first L-shaped member.

2. The tabletop charging stand according to claim 1, further comprising a charging cable attachable to the charging station; and one or more mounting brackets for securing a free end of the charging cable, each mounting bracket of the one or more mounting brackets secured to one L-shaped member of the two L-shaped members.

3. The tabletop charging stand according to claim 1, further comprising a handle mounted on two upper clamping screws of the four clamping screws.

4. The tabletop charging stand according to claim 1, further comprising an anti-theft member being L-shaped and attached at a first end to a bottom clamping screw of the four clamping screws, and a second end of the anti-theft member having a Kensington-type hole compatible with a lock.

\* \* \* \* \*